United States Patent
Obergünner et al.

(10) Patent No.: US 11,433,869 B2
(45) Date of Patent: Sep. 6, 2022

(54) CONTROLLING A DRIVE TORQUE AND DRIVE TRAIN ASSEMBLY

(71) Applicant: GKN Automotive Limited, Birmingham (GB)

(72) Inventors: Peter Obergünner, Cologne (DE); Harwin Niessen, Hürth (DE); Michael Höck, Neunkirchen-Seelscheid (DE); Theodor Gassmann, Siegburg (DE)

(73) Assignee: GKN Automotive Limited, Birmingham (GB)

(*) Notice: Subject to any disclaimer, the term of this patent is extended or adjusted under 35 U.S.C. 154(b) by 112 days.

(21) Appl. No.: 16/979,901

(22) PCT Filed: Mar. 12, 2018

(86) PCT No.: PCT/EP2018/056128
§ 371 (c)(1),
(2) Date: Sep. 11, 2020

(87) PCT Pub. No.: WO2019/174716
PCT Pub. Date: Sep. 19, 2019

(65) Prior Publication Data
US 2021/0009129 A1 Jan. 14, 2021

(51) Int. Cl.
*B60W 10/08* (2006.01)
*B60W 10/16* (2012.01)
*B60W 30/045* (2012.01)

(52) U.S. Cl.
CPC .......... *B60W 10/08* (2013.01); *B60W 30/045* (2013.01); *B60W 10/16* (2013.01);
(Continued)

(58) Field of Classification Search
CPC .... B60W 10/08; B60W 10/16; B60W 30/045; B60W 2510/0275; B60W 2510/0283;
(Continued)

(56) References Cited

U.S. PATENT DOCUMENTS 4,049,064 A * 9/1977 Chubb .................... E21B 7/022
173/147
5,788,005 A 8/1998 Arai
(Continued)

FOREIGN PATENT DOCUMENTS

DE 102014221055 A1 4/2016
DE 102015118759 A1 5/2017
(Continued)

OTHER PUBLICATIONS

International Search Report and Written Opinion for PCT/EP2018/05128 dated Nov. 30, 2018 (16 pages; with English translation).

*Primary Examiner* — Tisha D Lewis
(74) *Attorney, Agent, or Firm* — Bejin Bieneman PLC

(57) ABSTRACT

A drive torque of an electric motor for driving a driveline included in a driveline assembly of a motor vehicle can be controlled as a function of the vehicle speed in such a way that, when the vehicle speed is below a predetermined threshold value, the electric motor is controlled in a high torque mode and, when the vehicle speed is above the threshold value, the electric motor is controlled in a low torque mode.

19 Claims, 2 Drawing Sheets

(52) U.S. Cl.
 CPC ............... *B60W 2510/0275* (2013.01); *B60W 2510/0283* (2013.01); *B60W 2520/10* (2013.01); *B60W 2520/125* (2013.01); *B60W 2520/266* (2013.01); *B60W 2520/28* (2013.01); *B60W 2540/18* (2013.01); *B60W 2710/083* (2013.01)

(58) Field of Classification Search
 CPC ..... B60W 2520/125; B60W 2520/266; B60W 2520/28; B60W 2540/18; B60W 2710/083
 See application file for complete search history.

(56) References Cited

U.S. PATENT DOCUMENTS

| | | | |
|---|---|---|---|
| 10,369,986 B2 * | 8/2019 | Kim | ............... B60K 17/02 |
| 2004/0147366 A1 | 7/2004 | Aoki et al. | |
| 2013/0304341 A1 | 11/2013 | Sakaguchi | |
| 2016/0356370 A1 | 12/2016 | Richards et al. | |

FOREIGN PATENT DOCUMENTS

| | | | | |
|---|---|---|---|---|
| EP | 2353916 A1 * | 8/2011 | ............ | B60K 17/02 |
| EP | 2353916 A1 | 8/2011 | | |
| JP | H06320971 A | 11/1994 | | |
| WO | 2017157479 A1 | 9/2017 | | |

* cited by examiner

CONTROLLING A DRIVE TORQUE AND DRIVE TRAIN ASSEMBLY

CROSS-REFERENCE TO RELATED APPLICATIONS

This application is a national stage of, and claims priority to, Patent Cooperation Treaty Application No. PCT/EP2018/056128, filed on Mar. 12, 2018, which application is hereby incorporated herein by reference in its entirety.

BACKGROUND

Motor vehicles are known that have a first driveline with a first drive source for driving a first drive axle and a second driveline with a second drive source for driving a second drive axle. The drive sources may differ, for example one of the two drive sources may be designed as an internal combustion engine and the other as an electric machine. Such drive concepts are also referred to as "hybrid drive". The electric machine and the internal combustion engine can drive the vehicle either separately or in combination.

The electric machine can be followed by a transmission in a power path, which converts the rotary motion generated by the electric machine from fast to slow, and a power splitting unit which splits the introduced rotary motion onto two side shafts.

From EP 2 353 916 B1, a method for controlling a clutch arrangement of a motor vehicle driveline is known, which has two friction clutches with a common input member connected to a drive unit. The first friction clutch has a first output member connected to a first drive shaft and the second friction clutch has a second output member connected to a second drive shaft. The output shafts are each drivingly connected to an associated vehicle wheel. If different coefficients of friction of the road surfaces of the first or second vehicle wheel are detected, the two friction clutches are activated in such a way that the drive torque of both vehicle wheels is limited to the drive torque of the drive wheel with the lower coefficient of friction that can be transmitted to the road surface.

From DE 10 2015 118 759 A1 a method for controlling the drive torque and the drive speed in a driveline arrangement of a motor vehicle is known, which has two separate drivelines. The first driveline is driven by an internal combustion engine. The second driveline is driven by an electric machine. The method provides that the speeds of the first and second drive axles are monitored, a target speed for the electric machine for driving the second drive axle is determined, the electric machine is controlled in a target speed mode as a function of the speeds of the drive axles, a target torque for driving the second drive axle is determined on the basis of the speeds of the two drive axles, and the clutch in the second driveline is controlled in a target torque mode as a function of the speeds of the first and second drive axles.

From DE 10 2014 221 055 A1 a motor vehicle with a first drive machine in the form of an internal combustion engine for driving a first drive axle and a second drive machine in the form of an electric motor for driving a second drive axle is known. A drive control device is provided which is configured to control the first and the second drive machine depending on a target torque as a control variable. The drive torque specifications are converted into suitable control signals for operating the first and second driving machine.

From US 2016/0356370 A1 a control unit for the driveline of a motor vehicle is known. The control unit is configured to reduce the drive torque if the slip of a drive wheel of the first axle exceeds a predetermined threshold value. The control unit controls the torque applied to the wheels of a second axle and detects when different slippage is applied to the wheels, at which of the wheels the slippage exceeds a predetermined threshold value. The control unit then adjusts the torque.

From WO 2017 157479 A1 an electric drive for driving a drive axle of a motor vehicle is known. The electric drive comprises an electric machine with a motor shaft, a transmission unit with a transmission shaft which is rotatingly drivable by the motor shaft, and a double clutch unit. The double clutch unit comprises a clutch basket that is rotatingly drivable by the transmission shaft and two disk packs that are separately operable by respective actuators to transmit torque to a respective side shaft. Such a double clutch arrangement, which is also marketed by the applicant under the name 'Twinster' clutch, allows variable torque distribution to the two output shafts. Depending on the driving condition, the torque on the inside or outside wheel can be individually adjusted, which leads to improved driving dynamics and driving stability. This control principle is also known as active or variable torque distribution or "torque vectoring".

However, a variable torque distribution can lead to an undesired yaw moment around the vehicle vertical axis in driving situations with significantly different traction on the left and right vehicle wheels, also known as "µ split situation". Today's all-wheel drive arrangements with a double clutch unit in one drive axle use a complex control strategy to avoid such critical yaw moments, especially at higher speeds. The basic approach is to use a first control strategy ("Select-High-Strategy") at lower speed for maximum traction and a second control strategy ("Select-Low-Strategy") at higher speed for optimum driving stability.

In all-wheel drive systems with electric drive and double clutches for variable torque distribution, the torque distribution between the two vehicle wheels can be controlled by means of the double clutches.

SUMMARY

The present disclosure provides for a method, and a driveline assembly with which the method can be carries out, for controlling the drive torque of an electric motor for a driveline of a motor vehicle, with which a high driving stability is ensured both at high and low speeds.

Controlling the drive torque of an electric motor in the driveline of a motor vehicle can include, wherein the driveline comprises a first side shaft for driving a first vehicle wheel, a second side shaft for driving a second vehicle wheel, a controllable first friction clutch associated with the first side shaft, a controllable second friction clutch associated with the second side shaft, and a drive member arranged in the power path between the electric motor and at least one of the two friction clutches; the following steps: monitoring a drive speed value representing the speed of the drive member; monitoring a first speed value representing the speed of the first vehicle wheel; monitoring a second speed value representing the speed of the second vehicle wheel; determining a transmittable first clutch torque for the first friction clutch as a function of the drive speed value and the first speed value; determining a transmittable second clutch torque for the second friction clutch as a function of the drive speed value and the second speed value; monitoring a vehicle speed value representing the vehicle speed and comparing the vehicle speed value with a predetermined speed threshold value; and if the vehicle speed value is below the predetermined speed threshold value: controlling the electric motor in a high torque mode such that a motor torque generated by the electric motor is provided as required; and if the vehicle speed value is above the predetermined speed threshold: controlling the electric motor in a low torque mode such that the motor torque generated by the electric motor is less than twice the smaller one of the first and second transmittable clutch torque plus an additional torque that is less than 50% of the highest transmittable torque of the electric motor.

An advantage of the method is that it ensures high driving stability, especially at high vehicle speeds, with friction losses in the driveline being minimized by controlling the motor torque of the electric motor in the low torque mode. This is achieved by the described limitation of the motor torque provided by the electric motor when a driving situation with different friction coefficients between the two vehicle wheels ("p-split") is detected at speeds above the speed threshold. The power input to the friction clutch which is assigned to the vehicle wheel with greater slip respectively lower coefficient of friction to the road, is reduced accordingly to the drive torque that can be transmitted to the road. Consequently, the energy input into the respective friction clutch is also low, so that the method contributes to increased energy efficiency when operating the driveline. A further advantage is that the method can be carried out for as long as required if a driving situation arises with different coefficients of friction between the two vehicle wheels ("p-split"), since the heat input into the friction clutch with a lower transmittable drive torque is low and accordingly there is no thermal cut-off.

According to the disclosed method, when the electric motor is controlled in low torque mode, the driveline behaves like an open differential gearing that has a compensating effect between the two side shafts with regard to the transmittable rotational movement.

The drive member whose speed is sensed can in principle be any component in the power path between the electric motor and the friction clutch. The determined drive speed value can be used as a comparison value to determine the speed difference between the input and output of the clutch. For example, the drive member can be the motor shaft of the electric motor, a drive shaft connected to it, a gear wheel, a clutch input part or a drive member connected to it in a rotationally fixed manner. According to an exemplary embodiment, the speed of the clutch input part can be compared with the speed of the first clutch output part to determine the transmittable first clutch torque, and the speed of the clutch input part can be compared with the speed of the second clutch output part to determine the transmittable second clutch torque. The two clutch input parts have the same rotation speed and can also be designed in one piece according to a possible embodiment.

The additional torque may be provided to provide some traction on the wheel with greater slip, but on a scale such that any yaw moment that may occur is not critical and is manageable in terms of driving stability. In particular, it is provided that this additional torque is less than 50% of the maximum motor torque that can be generated by the electric motor, in particular less than 30%, as the case may be, also less than 10% of the maximum motor torque that can be generated by the electric motor. There are several possible options for the configuration of the additional torque, which can be used individually or in addition. In a simple embodiment, the additional torque may be fixed at a constant value (k), which may be between 5 Nm (Newton-meters) and 150 Nm, for example, wherein the upper limit may also be lower, for example 100 Nm or 50 Nm. Consequently, in the case of a control intervention, the motor torque (Tm) provided by the electric motor would be limited to twice the transmissible driving torque (T20low) of the vehicle wheel with the low coefficient of friction with the road plus the constant value (k), (Tm<2*T20low+k). According to another option, the additional torque (Tx) can be variably adjusted, e.g., depending on the vehicle speed. In particular, it could be provided that the additional torque at higher vehicle speeds would be set at a lower value than at lower vehicle speeds. It is also possible that the additional torque could be set as a function of the transmittable clutch torques determined. In particular, the additional torque may be set to a fraction of the difference between the first and second transmittable clutch torques, for example to a value less than a quarter of the difference torque.

Controlling the motor torque in a low or high torque mode means, in terms of control engineering, that the torque is the reference variable (setpoint) to be set to control the electric motor. Depending on the driving condition of the vehicle, the torque required by the electric motor for the desired driving dynamics is determined and the electric motor accordingly provides this motor torque, which is introduced into the driveline. In the high torque mode, a maximum motor torque is made available as required, i.e., without torque limitation, and introduced into the driveline. The traction requirement depends on the respective driving situation, for example, depending on the gradient and/or desired acceleration of the vehicle. In low torque mode, the motor torque of the electric motor is limited to a threshold value that is orientated on twice of the smallest transmittable clutch torque of the two vehicle wheels, as described above. Determining the motor torque in the select low mode is based at least on the rotation speeds of the two wheels of the electric motor-driven axle and the rotation speed of the electric motor or a component drivingly connected thereto. The component can be, for example, a clutch input part, in particular an outer plate carrier, which is drivingly connected to the electric motor. The motor torque can be calculated by an electronic control unit (ECU), for example. The two friction clutches may be controlled by the same or by another electronic control unit.

The electric motor converts energy and can operate in motor or generator mode, whereby the motor torque can be correspondingly positive or negative, depending on whether the vehicle is in thrust or drive mode. Controlling the electric motor's torque can be related to both operating modes accordingly. In motor or drive mode, the electric motor converts electrical energy into mechanical energy so that the driving axle and/or the two side shafts of the vehicle is drivable. The motor torque is positive, so that the method in low torque mode is related to the maximum drive torque that can be transmitted from the electric motor to the wheels, as described above. In generator or thrust mode, the electric motor converts mechanical energy into electrical energy, which can then be stored in a battery. The motor torque is negative, so that the method in low torque mode is related to the maximum braking torque that can be transmitted from the wheels to the electric motor, as described above. It is possible to recover the braking energy of the vehicle, which is also called recuperation.

As a further step, it may be provided that a lateral acceleration value representative of the lateral acceleration of the motor vehicle is monitored and a lateral acceleration signal is generated which can be used as a further input value for controlling the electric motor. In particular, the lateral acceleration signal can be used to determine the motor torque and/or the speed of the electric motor. Furthermore, the lateral acceleration signal can also be used to control the respective target torque to be transmitted by the two friction clutches. According to a possible implementation, the electric motor can be controlled in the high torque mode if the lateral acceleration signal is above a defined lateral acceleration threshold value and/or the electric motor can be controlled in the low torque mode if the lateral acceleration signal is below the defined lateral acceleration threshold value. Consideration of the lateral acceleration signal can take place optionally. This means that the motor torque can be controlled in the low torque mode if only the condition is fulfilled that the vehicle speed value is above the defined speed threshold value or additionally the condition is fulfilled that the lateral acceleration signal is above the defined lateral acceleration threshold value. The lateral acceleration threshold value may lie in particular between 2 m/s$^2$ (meters per second squared) and 4 m/s$^2$ and may be 3 m/s$^2$, for example.

The method is suitable for motor vehicles with only one driveline or for motor vehicles with two drivelines which are mechanically separated from each other. Mechanically separated means that the first and second drivelines are separate and no power-transmitting member is provided between the two drivelines. The electric motor serves solely to drive one driveline respectively one drive axle, while the other drive source serves solely to drive the other driveline respectively the other drive axle.

In a motor vehicle with two drivelines, in which the front axle is drivable by a front drive source and the rear axle is driven by the electric motor, it may be provided that a differential speed between the two vehicle wheels of the front axle is determined and the electric motor is controlled depending on the differential speed of the front axle wheels, such that the electric motor is controlled in the high torque mode when the differential speed is below a defined differential speed threshold, and that the electric motor is controlled in the low torque mode when the differential speed is above the defined differential speed threshold. Consideration of the differential speed for selecting between low torque mode and high torque mode can be made optionally, i.e., in addition to consideration of the vehicle speed value and, as the case may be, to consideration of the lateral acceleration signal. In particular, the differential speed threshold value may be between 20 rpm and 40 rpm and may be 30 rpm, for example. In general, it may be provided that the electric motor is operated to drive the rear axle if the axle speed of the front axle is greater than the axle speed of the rear axle.

To determine the axle speeds, at least one signal representing the speed of the respective vehicle axle can be sensed. For example, the averaged wheel speed of the right and left wheels of the respective axle or, if a differential is used in the front axle, also the speed of the differential basket can be used to calculate the axle speed. When activated, the electric motor can optionally be set to a target speed such that the vehicle axle driven by the electric motor is drivable with a higher speed than the vehicle axle driven by the combustion engine. It may also be provided that the electric motor is activated to drive the rear axle when the motor vehicle is cornering, wherein the target speed of the electric motor can then be set such that the rear axle is drivable at a higher speed than the front axle.

According to an example, wheel speed variables representative of the wheel speeds of the motor vehicle can be monitored and respective wheel speed signals can be generated therefrom. The wheel speed signals can be used to determine the motor torque of the electric motor, the target speed of the electric motor, the target torque of the first friction clutch and/or the target torque of the second friction clutch.

Controlling the vehicle's driving dynamics is particularly important when cornering, where the vehicle speed also plays a decisive role. In this respect, a further method step may be to monitor a steering value representative of the steering angle of the wheels of the motor vehicle and to generate a corresponding steering signal. The steering signal can then be used to adjust the motor torque and/or the motor speed of the electric motor and/or the respective target torque of the two friction clutches in order to influence the driving dynamics of the motor vehicle.

As a further step, it may be provided that an accelerator pedal variable representative of the position of the motor vehicle's accelerator pedal is monitored and an accelerator pedal signal is generated, whereby the accelerator pedal signal can be used to adjust the engine torque and/or the engine speed of the electric motor and/or the respective target torque of the two friction clutches.

It is to be understood that individual, several or all of the above-mentioned method steps can be carried out. This means that the steering signal, lateral acceleration signal, accelerator pedal signal and/or wheel speed signals can be used to control the engine torque and/or the speed of the electric motor individually or in combination. The same applies accordingly for controlling the torque that is transmittable by the two friction clutches. It is also possible that other variables could be monitored and used to determine the control variables, such as the longitudinal acceleration, the yaw rate of the motor vehicle and/or other signals that come into question.

According to a method implementation which can also be called recuperation mode, the two friction clutches can be closed when the vehicle is in thrust mode. In this context, thrust mode is understood to be a driving condition in which the electric motor is dragged (pushed) by the vehicle. In this way the electric motor is driven by the wheels of the second driving axle and operates in generator mode. The electric motor converts the mechanical energy introduced by the driving axle into electrical energy, which can be stored in a battery connected to the electric motor.

According to a further implementation, which can be described as sailing mode, the two friction clutches can be opened when the motor vehicle is operated in sailing mode, so that the electric motor is uncoupled from the wheels of the driveline. The term "sailing" is used here to include the function when the primary drive source (internal combustion engine) is disconnected from the associated driveline while the vehicle is in motion, without braking. In sailing mode, the electric motor can also be uncoupled from the side shafts, which is done by opening the clutches, and switched off if necessary.

The present disclosure further encompasses a drive arrangement for a motor vehicle, comprising: a driveline with an electric motor, a first side shaft for driving a first vehicle wheel, a second side shaft for driving a second vehicle wheel, a controllable first friction clutch associated with the first side shaft, a controllable second friction clutch associated with the second side shaft; and a drive member arranged in the power path between the electric motor and at least one of the two friction clutches; first sensor means for determining a first rotational speed value representing the rotational speed of the first side shaft; second sensor means for determining a second rotational speed value representing the rotational speed of the second side shaft; a drive speed sensor for determining a drive speed value representing the rotational speed of the drive member; and at least one control unit for controlling the electric machine; wherein the control unit is set up to carry out the method according to one or more of the above-mentioned embodiments.

The drive assembly offers the same advantages as the method according to the disclosure, so that reference is made to the above description in this respect. It is to be understood that all method-related features are transferable to the product, and vice versa, all features relating to the product are transferable to the process. By operating the electric motor at high speeds in a low torque mode ensures a high level of driving stability while reducing friction losses. A friction clutch is associated with each of the two sideshafts, which controls the torque that is transmittable by the associated sideshaft. The friction clutches can be arranged in the power path between the electric motor and the first or second side shaft, or within the respective side shaft.

The electric motor driven driveline can have a transmission unit that splits a torque introduced by the electric motor to two output parts. For example, the transmission unit can include an angular drive or spur gear drive. The transmission unit can be designed as a single-speed transmission, i.e., with a fixed transmission ratio between the transmission input and the transmission output. Alternatively, the transmission unit can also have a controllable gear stage with which a rotary motion introduced by the electric motor can be transmitted to different output speeds.

According to an embodiment, the first friction clutch comprises a first outer plate carrier drivingly connected to the electric motor and a first inner plate carrier drivingly connected to the first side shaft. Accordingly, the second friction clutch has a second outer plate carrier drivingly connected to the electric motor and a second inner plate carrier drivingly connected to the second side shaft. Preferably, the first outer plate carrier and the second outer plate carrier are connected to each other in a rotationally fixed manner, in particular in one piece.

It is provided that the first friction clutch and the second friction clutch are each continuously variable between an open position in which no torque is transmitted and a closed position in which full torque is transmitted. In this way, the required clutch torque, respectively drive torque, can be adjusted to the right and left wheels as required.

BRIEF SUMMARY OF THE DRAWINGS

Example embodiments are explained below using the drawing figures as examples. The figures include.

DESCRIPTION

Figure 1:
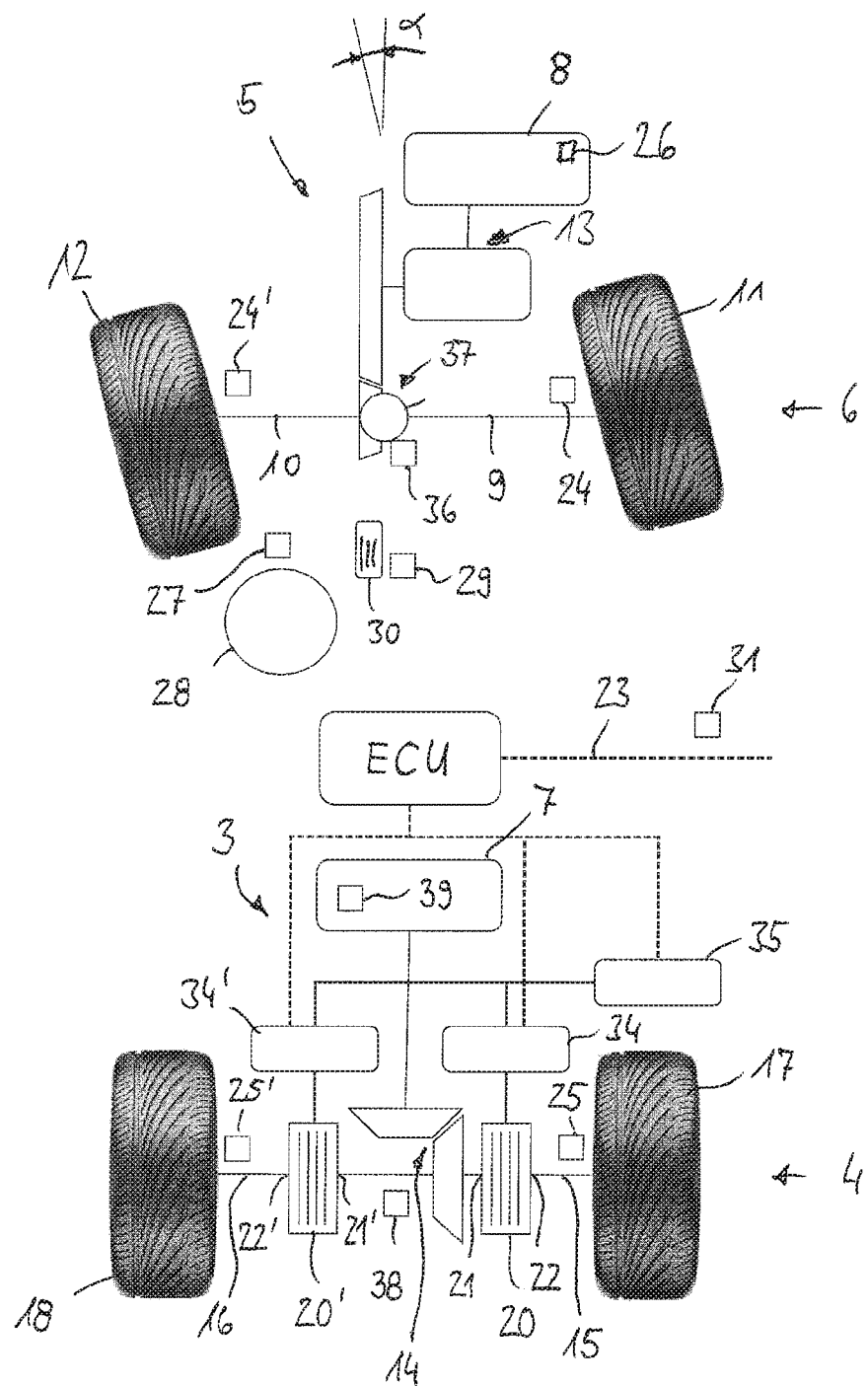
FIG. 1 is a schematic representation of y a driveline assembly of a motor vehicle for controlling the motor torque of an electric motor.
Figure 2:
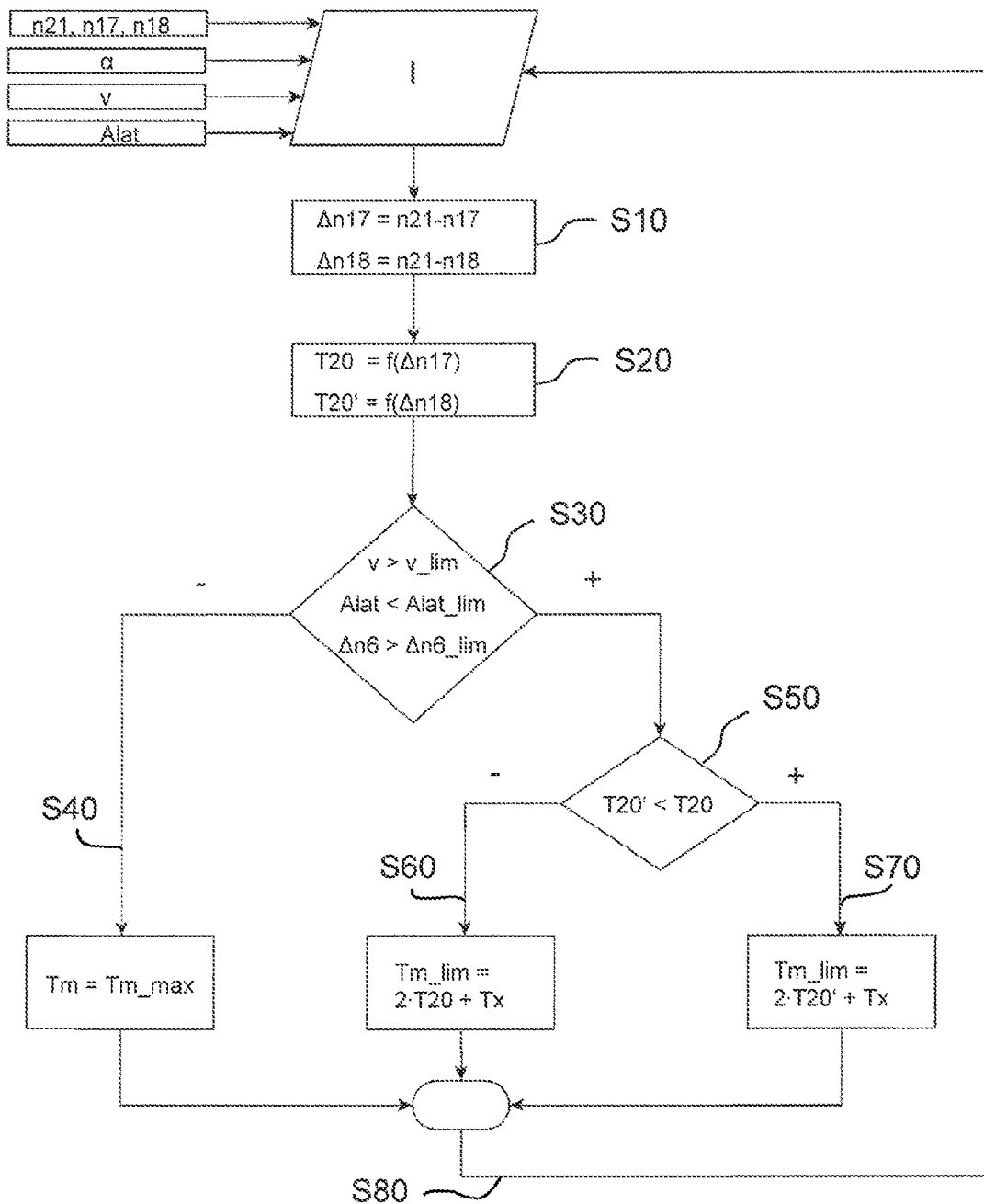
FIG. 2 is a flow chart for a method for controlling the motor torque of an electric motor in the driveline of a motor vehicle.

FIGS. 1 and 2, which are described together below, show a mechanical driveline assembly 2 of a motor vehicle. The driveline assembly 2 comprises a first driveline 3 with a first drive axle 4 and a second driveline 5 with a second drive axle 6.

The first driveline 3 is drivable by a first drive unit 7, which is an electric machine. The second driveline 5 is drivable by a second drive unit 8, which is an internal combustion engine, wherein a different drive source such as an electric machine would also be possible. The second drive unit 8 may be followed by a multi-step transmission 13, by which the engine torque is converted into a drive torque and, respectively, the engine speed into a drive speed.

It can be seen that the first drive axle 3 forms the rear axle and the second drive axle 6 the front axle of the motor vehicle, although an inverted arrangement is also possible. The two drivelines 3, 5 are mechanically separated from each other, i.e., no power transmission between the two drivelines is possible. The electric machine 7 serves solely to drive the first drive axle 4, while the drive source 8 serves solely to drive the second drive axle 6. A modified version is also possible in which only one vehicle axle is driven.

The front axle 6 comprises an axle differential 37, which distributes the introduced drive torque evenly to the right and left front side shafts 9, 10 of the motor vehicle. The two side shafts 9, 10 each comprise a constant velocity universal joint (not shown) at their transmission-side ends and at their wheel-side ends, which allow torque transmission to the wheels 11, 12 of the motor vehicle under angular motion.

The electric motor driven driveline 3 comprises a right side shaft 15 for driving the right vehicle wheel 17, a left side shaft 16 for driving the left vehicle wheel 18, a controllable first friction clutch 20 in the power path between the electric motor 7 and the right side shaft 15, and a controllable second friction clutch 20' in the power path between the electric motor 7 and the left side shaft 16. In the present embodiment, a rotary motion generated by the electric motor 7 is introduced via an optional angular drive 14 equally to the two clutch input parts 21, 21' of the two friction clutches 20, 20'. The output parts 22, 22' of the two clutches 20, 20' are connected to the respective side shaft 15, 16 for torque transmission. At the outer ends the two side shafts 15, 16 are connected to the wheels 17, 18 of the driving axle 4.

According to a modified embodiment not shown, the two friction clutches can also be designed as a clutch unit with a common clutch input part and two independently rotatable clutch output parts. In this case the common clutch input part is drivingly connected to the electric motor, while the right clutch output part is drivingly connected to the right side shaft and the left clutch output part is drivingly connected to the left side shaft. The common clutch input part can be as an outer plate carrier; accordingly, the clutch output parts can be inner plate carriers.

By means of the two friction clutches 20, 20' the torque transmission and distribution to the two side shafts 17, 18 is controlled. An axle differential is not provided. The two clutch input parts 21, 21' are rigidly connected to each other so that they rotate at the same speed n4, n21. To set different drive torques on the two vehicle wheels 17, 18, the clutches 20, 20' can each be controlled individually. The two clutches 20, 20' are each actuated by an associated actuator unit 34, 34' with which an axial force can be exerted on friction elements of the clutch to close the respective clutch 20, 20'. The actuator units 34, 34' can be designed as hydraulic actuator units which are supplied with hydraulic pressure from a pump 35. It is to be understood that other forms of actuator units are also possible, such as electromotive actuators, for example with ball ramp arrangement, or electromagnetic actuators.

The actuating units of the clutches 20, 20' and the electric machine 7 are controlled by an electronic control unit (ECU), which delivers corresponding electric control currents via lines to the clutches 20, 20' and the electric machine 7 respectively. A serial bus arrangement 23 is provided for the electrical signal transmission from and to the control unit (ECU), which can be designed as a CAN (Controller Area Network) bus, for example. Interfaces, protocols and electrical circuitry for signal transmission on a CAN bus are known and do not need not be explained in further detail. It is to be understood that as an alternative to a bus arrangement, individual wiring of the various electrical components of the vehicle to the control unit (ECU) may also be provided.

With the two clutches 20, 20' different driving conditions can be realized. The drive torque for driving the two side shafts 15, 16 of the associated drive axle 4 can be set individually and variably depending on the determined requirement (target torque). Furthermore, the two side shafts 15, 16 and the electric machine 7 can be connected or disconnected as required by means of the clutches 20, 20'. The clutches 20, 20' are friction clutches, which allow infinitely variable adjustment of the clutch torque that is transmittable between the respective clutch input part 21, 21' and the associated clutch output part 22, 22'. In the fully closed state, the side shafts 15, 16 are connected to each other in a rotationally fixed manner so that they rotate at the same speed n4. In the open state of the two clutches 20, 20', the two side shafts 15, 16 are mechanically separated from the electric motor 7, so that no torque is transmitted between the electric motor 7 and the wheels 17, 18. Between the closed position and the open position, the clutches 20, 20' can be continuously adjusted to any intermediate position, so that the torque transmitted to the right and left side shafts 15, 16 can be individually adjusted and controlled. For this purpose, the control unit (ECU) determines a target torque (T20, T20') individually for the associated clutch 20, 20'.

The control unit (ECU) comprises a program-controlled microprocessor and an electronic memory in which a control program is stored. The microprocessor generates control signals for the actuating units 34, 34' of the clutches 20, 20' and for the electrical machine 7 according to the control program. In order to generate corresponding control signals, the control unit (ECU) is dependent on information on various operating parameters of the motor vehicle. For this purpose, the control unit (ECU) can access various signals via the bus arrangement 23 which are representative of these operating parameters.

In particular, speed sensors 24, 24'; 25, 25' are provided, which provide information on the respective speed n11, n12, n18, n19 of each of the wheels 11, 12, 18, 19. From the measured speeds, the control unit (ECU) can calculate an axle speed n4 of the electric motor-driven vehicle axle 4 and/or an axle speed n6 of the second vehicle axle 6. In addition, a rotation speed sensor 38 may be provided for monitoring a signal representing the rotary speed n21 of the clutch input parts 21. Furthermore, a rotation speed sensor 36 may be provided for monitoring a signal representing the rotary speed n6 of the differential carrier of the differential 37 of the second vehicle axle 6. On the basis of the sensed rotational speeds n11, n12 of the front wheels 11, 12 or the rotational speed n6 of the differential carrier 37, it can be detected when one of the front wheels slips, so that the driving dynamics can then be intervened in a regulating manner by the control unit (ECU).

It is further provided that the control unit (ECU) accesses at least one engine signal which is representative of the provided engine torque (T8) and/or the engine speed (n8) of the drive unit 8. The engine signal is transmitted from a schematically represented engine sensor 26 to the bus arrangement 23. Furthermore, the control unit (ECU) has access to a steering angle signal. The steering angle signal is generated by a rotation angle sensor 27 which detects the rotational position of the steering wheel 28 of the motor vehicle and/or a steering column carrying the steering wheel 28. The rotational position of the steering wheel and/or steering column is a measure of the steering angle of the motor vehicle marked a, i.e., the angular deviation of the front wheels from a straight position.

Another input signal for the control unit (ECU) can be a pedal position signal, which indicates the position of the accelerator pedal 30 of the motor vehicle by means of a pedal sensor 29. It may also be provided that the control unit (ECU) can access one or more acceleration signals of the motor vehicle which are representative of the lateral acceleration Alat of the motor vehicle about the vertical axis and/or the longitudinal acceleration of the motor vehicle. An acceleration sensor 31 is schematically drawn for this purpose, which is also connected to the control unit (ECU) via the bus arrangement 23.

It may also be provided that the control unit (ECU) accesses other signals, for example a gear position signal which detects the gear position of the multi-step transmission. In addition, the control unit (ECU) can determine a speed of the motor vehicle according to known techniques.

A feature of the present control concept is that the electric machine 7 is controlled in a torque mode depending on the vehicle speed. It is specifically provided that if the vehicle speed is below a predetermined speed threshold value v_lim, the electric motor 7 is controlled in a high torque mode, wherein the provided motor torque Tm is unlimited, respectively is set according to the demand (Tm=Tm_max). If the vehicle speed is above the predetermined speed threshold value, the electric motor 7 is controlled in a low torque mode in such a way that the motor torque Tm generated by the electric motor 7 is limited to a limit value Tm_lim which is smaller than the maximum motor torque. The limited motor torque Tm_lim is less than or equal to twice the smaller (T20low) of the first and second transmittable clutch torques (T20', T20) plus an additional torque (Tx), i.e. Tm_lim≤2*T20low+Tx). In particular, the additional torque Tx can be less than or equal to 50% of the maximum producible torque Tm_max of the electric motor 7. The determination of the clutch torques T20', T20 transmittable by the friction clutches 20, 20' is carried out in each case as a function of at least the speed values n17, n18 of the two vehicle wheels 17, 18 of the electric motor-driven axle 4, in each case in relation to the speed n21 of the clutch input parts 21, 21'.

Further details are explained below using the flow chart according to FIG. 2.

It can be seen that the speed n21 of the clutch input parts 21, 21', the speeds n17, n18 of the wheels 17, 18, the vehicle speed v, the steering angle signal α, and the lateral acceleration signal Alat are considered as input variables I for controlling the motor torque Tm of the electric motor 7. The last two signal values, i.e., the steering angle signal α and lateral acceleration signal Alat are optional.

In step S10 it is determined whether any slip exists between one of the two wheels 17, 18 of the electric motor-driven axle 4 and a drive component 21 upstream of the friction clutches 20, 20' in the power path. For this purpose, the difference between the speed n17 of the right wheel 17 and the speed n21 of the clutch input part 21, respectively the difference between the speed n18 of the left wheel 18 and the speed n21 of the clutch input part 21', can be used. The speed n21 of the respective clutch input part 21, 21' or a component connected thereto is recorded by means of speed sensor 38. According to a modified embodiment, the two friction clutches 20, 20' can also be designed as one unit. In this case, the two clutch input parts 21, 21' can be designed in one piece, in particular in the form of an outer plate carrier. In this case the inner plate carriers would be connected to the respective side shaft in a rotationally fixed manner. It is to be understood that, when calculating the slip, any speed difference between the right and left wheels 17, 18 which may be present due to cornering is taken into account, respectively deducted.

In a further step S20 the clutch torque T20 transmittable by the right-hand clutch 20 is calculated as a function of the speed difference between the speed n17 of the right-hand vehicle wheel 17 and the speed n21 of the clutch input part 21. Accordingly, the clutch torque T20' transmittable by the left-hand clutch 20' is calculated as a function of the speed difference between the speed n18 of the left-hand vehicle wheel 18 and the speed n21' of clutch input part 21'. The first and second clutch parts 21, 21' are rigidly connected to each other and thus have the same speed (n21=n21').

The vehicle speed v and optionally other values such as the lateral acceleration Alat and/or a possible differential speed between the two wheels 11, 12 of the front axle 6 are continuously monitored.

Depending on whether the vehicle speed value representing the vehicle speed v is above or below a defined speed threshold value v_lim, and, as the case may be, whether the determined lateral acceleration signal Alat is above or below a defined lateral acceleration threshold value Alat_lim, and, as the case may be, whether a speed difference $\Delta$n6 between the right and left wheels 11, 12 of the front axle 6 (so-called $\mu$ splilt driving condition) is above or below a defined speed difference value $\Delta$n6_lim, a case distinction is then made in step S30 as to whether the electric motor 7 is operated in high torque mode ("select high") or in low torque mode ("select low").

If the vehicle speed v is below (less than or "−" as shown in FIG. 2) the specified threshold value v_lim, which can be between 50 and 70 km/h, for example, the electric motor 7 is controlled in high torque mode so that the provided motor torque (Tm) is unlimited (Tm=Tm_max). This mode, which can also be called "Select-High", is shown in the left branch S40 of FIG. 2. In this operating mode, both friction clutches 20, 20' can each be controlled so that they transmit a maximum clutch torque. The maximum transmittable clutch torque corresponds at least essentially to the drive torque transmittable to the road from the associated vehicle wheel 17, 18.

If the vehicle speed is above (greater than or "+" as shown in FIG. 2) the specified threshold, the motor torque Tm of electric motor 7 is limited to a limit value T_lim (Tm=T_lim). This case is shown in the right-hand branch of FIG. 2. The limited motor torque (Tm_lim) is based on the transmittable clutch torque (T20', T20) of that clutch 20, 20' whose corresponding vehicle wheel 17, 18 has the lower traction to the road. In step S50 a case distinction is made as to whether a different transmittable clutch torque T20', T20 is present between the two friction clutches 20, 20' due to slip, or which transmittable clutch torque T20', T20 is possibly greater and which is smaller due to slip.

In particular, it is provided that the limited motor torque (Tm_lim) is less than or equal to twice the smaller (T20low) of the first and second transmittable clutch torques (T20', T20) plus an additional torque Tx, i.e. Tm_lim$\leq$2*T20low+ Tx. The additional torque Tx can be determined in various ways and is in particular less than 50% of the maximum producible torque Tm_max of the electric motor 7, i.e. Tm_lim$\leq$2*T20low+0.5 Tm_max.

If there is slip on the right wheel 17 of the vehicle, i.e. the transmittable clutch torque T20 of the right friction clutch 20 is less than the transmittable clutch torque T20' of the left friction clutch 20', the threshold value for the engine torque Tm is determined as a function of the transmittable clutch torque T20 of the right friction clutch 20. Here Tm_lim=2*T20+Tx. This possibility is shown in the left branch S60. If there is slip on the left-hand vehicle wheel 18, i.e. the transmittable clutch torque T20' of the left-hand friction clutch 20' is less than the transmittable clutch torque T20 of the right-hand friction clutch 20, the threshold value for the engine torque Tm is determined as a function of the transmittable clutch torque T20' of the left-hand friction clutch 20'. Here Tm_lim=2*T20'+Tx. This possibility is shown in the right branch S70. The end of the method is marked S80.

The additional torque Tx can be provided to make some traction available on the wheel 17, 18 with greater slip, but on a scale where any yaw moment is uncritical and can be easily handled in terms of driving stability. Several possibilities are conceivable for the concrete determination of the additional torque Tx. In a simple implementation, the additional torque can be fixed at a constant value k, which can, for example, be between 5 Nm and 150 Nm, i.e. Tx=k. Consequently, the motor torque Tm provided by the electric motor 7 would be limited, in the case of control intervention, to twice the transmittable driving torque T20low of the vehicle wheel 17, 18 with the low coefficient of friction with the road plus this constant value k, i.e. Tm<Tm_lim=2× T20low+k. It is also possible to adjust the additional torque variably, preferably depending on the vehicle speed. In particular, it may be provided that the additional torque at higher vehicle speeds is set to a smaller value than at lower vehicle speeds. In particular, it is provided that the additional torque Tx is less than or equal to 50% of the maximum motor torque of electric motor 7.

The method can be performed both in traction mode, i.e., when the electric motor converts electrical energy into mechanical energy to drive the vehicle, and in thrust mode, i.e., when the electric motor converts mechanical energy into electrical energy to brake the vehicle.

An advantage of the method is that it ensures high driving stability, especially at high vehicle speeds, with friction losses in the driveline being minimized by controlling the motor torque Tm of electric motor 7 in low torque mode. The power input to the friction clutch, which is assigned to the vehicle wheel 17, 18 with greater slip, and/or lower friction coefficient to the road, is reduced accordingly to the drive torque that is transmittable to the road. Consequently, the energy input into the respective friction clutch 20, 20' is also low, so that the method contributes to an increased energy efficiency when operating the driveline.

LIST OF REFERENCE SIGNS 2 driveline assembly
3 first driveline
4 first drive axle
5 second driveline
6 second drive axle
7 electric machine/electric motor
8 drive source
9 sideshaft
10 sideshaft
11 wheel
12 wheel
13 transmission 14 angular drive
15 sideshaft
16 sideshaft
17 differential carrier
18 wheel
19 wheel
20, 20' clutch
21 clutch input part
22 clutch output part
23 bus arrangement
24 speed sensor
25 speed sensor
26 motor sensor
27 angle of rotation sensor
28 steering wheel
29 pedal sensors
30 accelerator pedal
31 accelero sensor
34 actuator unit
35 pump
36 speed sensor
37 axle differential
38 speed sensor
39 motor sensor
Alat lateral acceleration
α steering angle
ECU electronic control unit
I input signal
n speed
S10-S80 step
T torque
v speed

The invention claimed is:

1. A method for controlling a motor torque of an electric motor in a driveline of a motor vehicle, the driveline comprising a first side shaft for driving a first vehicle wheel, a second side shaft for driving a second vehicle wheel, a controllable first friction clutch which is associated with the first side shaft, and a controllable second friction clutch which is associated with the second side shaft, and a drive member arranged in a power path between the electric motor and at least one of the first and second friction clutch; wherein the method comprises:
  obtaining a drive speed value representing the rotation speed of the drive member;
  obtaining a first wheel speed value representing the rotation speed of the first vehicle wheel;
  obtaining a second wheel speed value representing the rotation speed of the second vehicle wheel;
  determining a transmittable first clutch torque for the first friction clutch as a function of the first wheel speed value relative to the drive speed value;
  determining a transmittable second clutch torque for the second friction clutch as a function of the second wheel speed value relative to the drive speed value;
  determining a smaller one of the transmittable first clutch torque and the transmittable second clutch torque;
  obtaining a vehicle speed value representing the vehicle speed and determining that the vehicle speed value is one of above or below a predetermined speed threshold value; and
  selecting one of a high torque mode or a low torque mode according to the vehicle speed value being below the predetermined speed threshold value or above the predetermined speed threshold value;
  wherein in the high torque mode a motor torque generated by the electric motor is provided without being limited; and
  wherein in the low torque mode the motor torque generated by the electric motor is less than twice the smaller one of the transmittable first clutch torque and the transmittable second clutch torque, plus an additional torque of up to 50% of a maximum generatable torque of the electric motor.

2. The method according to claim 1, further comprising:
  obtaining a lateral acceleration value representing a lateral acceleration of the motor vehicle and generating a lateral acceleration signal,
  wherein the electric motor is controlled as a function of the lateral acceleration signal, such that:
  the electric motor is controlled in the high torque mode when the lateral acceleration signal is above a defined lateral acceleration threshold value, and
  the electric motor is controlled in the low torque mode when the lateral acceleration signal is below the defined lateral acceleration threshold.

3. The method according to claim 2,
  wherein the lateral acceleration signal is used to determine at least one of:
  the motor torque of the electric motor,
  a target speed of the electric motor,
  the transmittable first clutch torque of the first clutch, or
  the transmittable second clutch torque of the second clutch.

4. The method according to claim 1,
  wherein the motor vehicle has a driven front axle and a rear axle, wherein the driveline which is drivable by the electric motor is assigned to the rear axle,
  the method further comprising:
  detecting a differential speed between a first side shaft and a second side shaft of the front axle; and
  controlling the electric motor depending on the differential speed such that:
  the electric motor is controlled in the high torque mode when the differential speed is below a defined differential speed threshold, and
  the electric motor is controlled in the low torque mode when the differential speed is above the defined differential speed threshold.

5. The method according to claim 1, further comprising:
  generating wheel speed signals of the first wheel speed value and the second wheel speed value, wherein the wheel speed signals are used to determine at least one of:
  the motor torque of the electric motor,
  a target speed of the electric motor,
  the transmittable first clutch torque of the first clutch, or
  the transmittable second clutch torque of the second clutch.

6. The method according to claim 1, further comprising:
  obtaining a steering value representing a steering angle of the motor vehicle and generating a steering signal,
  wherein the steering signal is used to determine at least one of:
  the motor torque of the electric motor,
  a target speed of the electric motor,
  the transmittable first clutch torque of the first clutch, or
  the transmittable second clutch torque of the second clutch.

7. The method according to claim 1,
wherein, to determine the transmittable first clutch torque, a speed of a first clutch input part is compared with a speed of a first clutch output part and,
wherein, to determine the transmittable second clutch torque, a speed of the a clutch input part is compared with a speed of a second clutch output part.

8. The method according to claim 1,
wherein the motor torque of the electric motor is positive, wherein the electric motor in the high torque mode is set to a maximum generatable driving torque, or
wherein the motor torque of the electric motor is negative, wherein the electric motor in the high torque mode is set to a maximum generatable braking torque.

9. A driveline assembly for a motor vehicle, comprising:
a driveline with an electric motor, a first side shaft for driving a first vehicle wheel, a second side shaft for driving a second vehicle wheel, a controllable first friction clutch which controls a torque transmittable by the first side shaft, a controllable second friction clutch which controls a torque transmittable by the second side shaft, and a drive member arranged in a power path between the electric motor and at least one of the first friction clutch and the second friction clutch; and
an electronic control unit that is configured to:
obtain a first wheel speed value representing the rotation speed of a first vehicle wheel, a second wheel speed value representing the rotation speed of a second vehicle wheel, and a drive speed value representing the rotation speed of the drive member;
obtain the drive speed value representing the rotation speed of the drive member;
obtain the first wheel speed value representing the rotation speed of the first vehicle wheel;
obtain the second wheel speed value representing the rotation speed of the second vehicle wheel;
determine a transmittable first clutch torque for the first friction clutch as a function of the first wheel speed value relative to the drive speed value;
determine a transmittable second clutch torque for the second friction clutch as a function of the second wheel speed value relative to the drive speed value;
determine a smaller one of the transmittable first clutch torque and the transmittable second clutch torque;
obtain a vehicle speed value representing the vehicle speed and comparing the vehicle speed value with a predetermined speed threshold value;
if the vehicle speed value is below the predetermined speed threshold value:
control the electric motor in a high torque mode such that a motor torque generated by the electric motor is provided without being limited;
if the vehicle speed value is above the predetermined speed threshold value:
control the electric motor in a low torque mode such that the motor torque generated by the electric motor is less than twice the smaller one of the transmittable first clutch torque and the transmittable second clutch torque, plus additionally up to 50% of a maximum generatable torque of the electric motor.

10. The driveline assembly according to claim 9,
wherein the first friction clutch comprises a first outer plate carrier drivingly connected to the electric motor and a first inner plate carrier drivingly connected to the first side shaft, and,
wherein the second friction clutch comprises a second outer plate carrier drivingly connected to the electric motor, and a second inner plate carrier drivingly connected to the second side shaft,
wherein the first outer plate carrier and the second outer plate carrier are connected to one another in a rotationally fixed manner.

11. The driveline assembly according to claim 9,
wherein the driveline with the electric motor is associated with a rear axle of the motor vehicle, wherein a driveline for driving a front axle of the motor vehicle is further provided, which is mechanically separated from the driveline of the rear axle.

12. The driveline assembly according to claim 9, wherein the first friction clutch and the second friction clutch are each continuously variable between an open position in which no torque is transmitted and a closed position in which a full torque is transmitted.

13. The driveline assembly according to claim 9, wherein the electronic control unit is further configured to:
obtain a lateral acceleration value representing a lateral acceleration of the motor vehicle and generating a lateral acceleration signal,
wherein the electric motor is controlled as a function of the lateral acceleration signal, such that:
the electric motor is controlled in the high torque mode when the lateral acceleration signal is above a defined lateral acceleration threshold value, and
the electric motor is controlled in the low torque mode when the lateral acceleration signal is below the defined lateral acceleration threshold.

14. The driveline assembly according to claim 13, wherein the electronic control unit is further configured such that the lateral acceleration signal is used to determine at least one of:
the motor torque of the electric motor,
a target speed of the electric motor,
the transmittable first clutch torque of the first clutch, or
the transmittable second clutch torque of the second clutch.

15. The driveline assembly according to claim 9,
wherein the motor vehicle has a driven front axle and a rear axle, wherein the driveline which is drivable by the electric motor is assigned to the rear axle, and
wherein the electronic control unit is further configured to:
detect a differential speed between a first side shaft and a second side shaft of the front axle; and
control the electric motor depending on the differential speed such that:
the electric motor is controlled in the high torque mode when the differential speed is below a defined differential speed threshold, and
the electric motor is controlled in the low torque mode when the differential speed is above the defined differential speed threshold.

16. The driveline assembly according to claim 9, wherein the electronic control unit is further configured to:
generate wheel speed signals of the first wheel speed value and the second wheel speed value, wherein the wheel speed signals are used to determine at least one of:
the motor torque of the electric motor,
a target speed of the electric motor,
the transmittable first clutch torque of the first clutch, or
the transmittable second clutch torque of the second clutch.

17. The driveline assembly according to claim 9, wherein the electronic control unit is further configured to:
  obtain a steering value representing a steering angle of the motor vehicle and generate a steering signal, wherein the steering signal is used to determine at least one of:
  the motor torque of the electric motor,
  a target speed of the electric motor,
  the transmittable first clutch torque of the first clutch, or
  the transmittable second clutch torque of the second clutch.

18. The driveline assembly according to claim 9, wherein the electronic control unit is further configured such that,
  to determine the transmittable first clutch torque, a speed of a first clutch input part is compared with a speed of a first clutch output part and,
  to determine the transmittable second clutch torque, a speed of a second clutch input part is compared with a speed of a second clutch output part.

19. The driveline assembly according to claim 9, wherein the electronic control unit is further configured such that,
  if the motor torque of the electric motor is positive, the electric motor in the high torque mode is set to a maximum generatable driving torque, and
  if the motor torque of the electric motor is negative, the electric motor in the high torque mode is set to a maximum generatable braking torque.

* * * * *